United States Patent

Engel et al.

[11] Patent Number: 5,938,128
[45] Date of Patent: Aug. 17, 1999

[54] PROCESS AND APPARATUS FOR TREATING COMPOSITE ELEMENTS

[76] Inventors: Rudolf Engel, Weinbergstr. 25 a, CH-8253 Elgg, Switzerland; Christoph Muther, Breite Str. 6, CH-8108 Dällikon, Switzerland

[21] Appl. No.: 08/716,441
[22] PCT Filed: Mar. 22, 1995
[86] PCT No.: PCT/EP95/01071
 § 371 Date: Sep. 19, 1996
 § 102(e) Date: Sep. 19, 1996
[87] PCT Pub. No.: WO95/25595
 PCT Pub. Date: Sep. 28, 1995

[30] Foreign Application Priority Data

Mar. 23, 1994 [DE] Germany .............................. 44 09 982
Nov. 21, 1994 [DE] Germany .............................. 44 41 309

[51] Int. Cl.⁶ .................................................. B02C 19/18
[52] U.S. Cl. ..................................... 241/1; 241/3; 241/19; 241/23; 241/24.14; 241/24.18
[58] Field of Search ............................. 241/3, 101.4, 53, 241/24.14, 48, 50, 56, 18, 1, 19, 23, 24.18

[56] References Cited

U.S. PATENT DOCUMENTS 2,561,388  7/1951  Lykken et al. ............................ 241/53
3,071,330  1/1963  Jackering ................................. 241/53

FOREIGN PATENT DOCUMENTS

1562613    4/1969  France .
4200827    7/1993  Germany .
4213274   10/1993  Germany .
405146701  6/1993  Japan .................................. 241/24.14
9305883    4/1993  WIPO .

Primary Examiner—Mark Rosenbaum
Attorney, Agent, or Firm—Bachman & Lapointe, P.C.

[57] ABSTRACT

In a process for treating composite elements of solid organic and/or inorganic composite materials-such as composites of metal/metal, plastic/plastic, metal/plastic or mineral composites with metals and/or plastic materials-solid particles are produced from the composite elements and they are added to a transport fluid, wherein at least one flow obstacle which crosses the flow of the mixture of solid particles and transport fluid is moved relative to said flow as a flow-breakaway edge for forming eddies which acceleratingly break up the mixture. The mixture is fed to the separation or break-up procedure at the flow-breakaway edge or edges with an acceleration of 20 to 25 m/sec² and the composite element is preferably crushed prior to the separation or break-up procedure.

29 Claims, 7 Drawing Sheets

COMPONENT 70
COMPONENT 72
COMPONENT 73

PROCESS AND APPARATUS FOR TREATING COMPOSITE ELEMENTS

The invention concerns a process and an apparatus for treating composite elements comprising solid organic and/or inorganic composite materials such as composites of metal/metal, plastic/plastic, metal/plastic or mineral composites with metals and/or plastics.

Composite elements of that kind are for example tin-plated copper conductor tracks of circuit arrangements, fibre-reinforced plastic materials or copper-plated aluminium wires in co-extruded or laminated form. Thus metal-metal composites—for example in the case of coaxial cables—primarily comprise a metal carrier, for example an aluminium wire, with a galvanically or thermally applied copper layer, while plastic-plastic laminates, in the situation of use involving packaging foil for foodstuffs, comprise a plastic carrier formed by polyamides (PA) with polyethylene (PE) which is co-extruded therewith, laminated therewith or applied thereto by a lining procedure. Plastic-metal composites are also joined together by a lining or laminating procedure, for example in the case of a glass fibre epoxy plate as a carrier with the application of copper as a base material for printed circuits. Metal-plastic composites include inter alia a carrier of aluminium sheet with a protective foil stuck thereon comprising polypropylene (PP) for facing or facade panels and weather-protective cladding arrangements.

Those composite elements give rise to problems in particular in terms of disposal as hitherto the materials in the composite have not been separated. Nowadays those composite elements are almost exclusively dumped or burnt—which is not environmentally friendly—and they are thus taken out of economic circulation.

The composite elements which in future will have to be disposed of in an orderly fashion include in particular also residues from the packaging sector. It is precisely in that area that co-extruded and laminated products have hitherto been irreplaceable as the materials in the composite have in combination excellent packaging properties.

In the conventional processing procedure, the composite element is broken up by way of the grain or particle size which is smaller than the respective layer thickness of the components. This breaking-up operation is generally effected by using an at least one-stage very fine crushing operation using suitable mills, for example hammer, impact or counter-flow mills, possibly with the assistance of nitrogen for inerting and deep-freezing purposes.

The object of the present invention is to develop a process and an apparatus of the kind set forth in the opening part of this specification, with which composite elements can be so treated that valuable substances can be recovered; a further aim of the invention is that the composite materials can be put back into economic circulation, without adversely affecting the environment.

That object is attained by the teachings of the independent claims; the appendant claims set forth advantageous developments.

In the process according to the invention, solid particles are produced from the above-mentioned composite elements and the particles are fed to a transport fluid such as air, wherein at least one flow obstacle which crosses the flow of the mixture of solid particles and transport fluid is moved relative to said flow as a flow-breakaway edge for forming downstream eddies which acceleratedly break up the mixture. When the mixture passes into those eddies, that involves both a sudden increase in the acceleration of the solid particles and also causes them to be rubbed against each other, thereby breaking them up.

For that purpose it has been found desirable for the mixture of transport fluid and solid particles to be fed to the separation or breaking-up procedure at the flow-breakaway edge or edges with an acceleration of 20 to 25 m/sec$^2$ after the composite elements to be treated have been reduced in size—preferably to a grain size of 5 mm to 30 nm—or have been compacted prior to the separation or breaking-up procedure.

The composite substances to be treated by this process, before being selectively broken up, are pre-crushed to form particles which are above the grain size of fine crushing procedures, and are then fed to the separation or breaking-up zone and thus accelerated in an air flow. The individual substances in the composite are liberated, and the physically different metal layers and also the plastic layers separate from each other. That mutual separation occurs along the phase boundaries.

Advantageously, during the separation or breaking-up procedure, a process temperature of between 10° C. and 75° C., in particular about ambient temperature, should be used, and there should be a peripheral speed at the flow-breakaway edge of between 50 and 200 m/sec, preferably between 70 and 180 m/sec.

By virtue of those measures, in the separation or break-up region, the adhesion between the components of the solid particles is overcome by virtue of acceleration and frictional forces which exceed the force thereof; separation of the components of the solid particles from each other is preferably effected with the application of heat or with the introduction of liquid and/or gas.

The following operating parameters in the separation or breaking-up region are in accordance with the invention:

An acceleration of the solid particles of between 20 and 60 m/sec$^2$, preferably between 23 and 53 m/sec$^2$, a peripheral speed of between 70 and 200 m/sec, preferably between 72 and 180 m/sec, and a quantitative air through-put of between 5000 and 8500 Nm$^3$/h.

Thus for example for composite elements with a high level of surface adhesion—for example a tube laminate whose aluminiun foil is coated on both sides with LDPE (low density polyethylene)—levels of acceleration of 35 to 40 m/sec$^2$ and in particular about 38 m/sec$^2$, a temperature of 70 to 80° C. and in particular about 75° C., a peripheral speed of 150 to 200 m/sec and in particular about 180 m/sec, and an air through-put of from 5000 to 5600 Nm$^3$/h and in particular about 5250 Nm$^3$/h have been found to be particularly desirable.

For internal cladding arrangements in the motor vehicle industry—such as instrument panels with ABS, PUR-foam and PVC-foils—or composites of a corresponding construction, the following were established as operating parameters:

Levels of acceleration of from 20 to 30 m/sec$^2$ and in particular about 23 m/sec$^2$, a temperature of from 25 to 35° C. and in particular about 30° C., a peripheral speed of from 68 to 77 m/sec and in particular about 72 m/sec and an air through-put of 7800 to 8500 Nm$^3$/h and in particular about 8100 Nm$^3$/h.

For the sector of coated wire bodies such as aluminium wires with a metal coating and a PVC-sheath, the operating values should be as follows:

A level of acceleration of from 48 to 56 m/sec$^2$ and in particular about 53 m/sec$^2$, a temperature of from 35 to 45° C. and in particular about 40° C., a peripheral speed of from 80 to 90 m/sec and in particular about 85 m/sec and an air through-put of from 6000 to 7000 Nm³/h, in particular about 6320 Nm³/h.

It will be clear that the adjustable parameters of the breaking-up operation must be adapted to the kind of solid particles which is to be treated; as indicated above, the particles are selectively broken up in dependence on their different physical properties—in particular density, tensile tearing strength, resiliency, thermal expansion and thermal transfer as well as elasticity and the molecular structural differences connected thereto, and the adhesions of the composite materials to each other are destroyed.

The selective breaking-up procedure causes the composite element to be broken down into widely different structures, in which respect the individual components also behave differently in terms of dimensions and geometry, as a result of their different characteristics. It has been found that in the selective breaking-up procedure the components of polyethylene remain substantially unchanged while metal components, for example of aluminium—which were previously in flat form—roll up and are deformed into onion-like structures. Plastic composites, for example polystyrene-polyethylene break up into different structures—without marked deformation—, with clear distinctions in relation to particle sizes; they are considerably larger than the above-mentioned onion-like structures.

The different breaking-up or deformation characteristics of the metals provide that the individual components become detached from each other so that subsequently it is possible for the plastic materials, the mineral fibre components and the metal constituents to be removed separately. Thus for example the large particles are separated from the small particles as the products which are less substantially broken up remain in the sieve or filter while the smaller particles pass through the meshes. Further separation is made possible in a separating table and/or by means of a fluid bed, in which respect the structures, densities and geometrical and gravimetric differences have the effect of enhancing the operating procedure.

The above-described selective breaking-up operation is effected in an apparatus which provides a flow path for the transport fluid carrying solid particles produced from the composite element or elements, for example by a crushing procedure, which flow path is defined by a wall which is profiled transversely relative to the flow direction, and an array of successive tools which are moved relative to the wall; the latter respectively form in the flow direction at least one flow-breakaway edge for producing a downstream eddy in the transport fluid and solid particles carried thereby. Preferably the tools rotate as parts of a rotor in a housing which includes the wall and which constitutes a stator. The breaking-up effect occurs in the roll-like eddy in dependence on the adhesion and the layer thickness of the solid particles, the residence time in that breaking-up region and the peripheral speed of the rotor, as well as the level of intensity achieved in regard to the eddies produced.

The material which has been pre-crushed is accelerated by tools of the rotor in the air flow. In the eddies which occur in that situation—up to the ultrasonic range—the supplied material provides for a mutual breaking-up effect. The individual substances in the composite are liberated and the physically different metal layers and also the plastic material layers become detached from each other. In the described manner, the metal layers roll up and form onion-like structures. In that respect the diameter of the onion structures produced becomes a multiple of the layer thickness of the previously flat composite. Due to their different physical properties the plastic layers produce a different structure and geometry relative to each other and relative to the metal layers which in turn behave differently relative to each other or also relative to mineral constituents of the composite.

All in all this process operates in an extremely effective and energy-saving manner. By virtue of the mutual breaking-up effect as a result of the material impacting against itself the amount of wear on the tools of the rotor is kept very slight, which has a very efficient effect in operation on the service life and the availability of the apparatus or corresponding items of equipment. It is to be mentioned in particular that the fractions finally occur in almost pure form and thus go back into economic circulation in an extremely favourable manner.

Further advantages, features and details of the invention will be apparent from the following description of preferred embodiments and with reference to the drawing in which:

FIG. 5 is a view in cross-section through FIG. 4 taken along line V—V thereof showing detail on an enlarged scale, FIG. 10 is a plan view of a further tool, FIG. 11 is a side view of FIG. 10, FIGS. 12 to 14 show perspective views of parts of composite elements.

Figure 1:
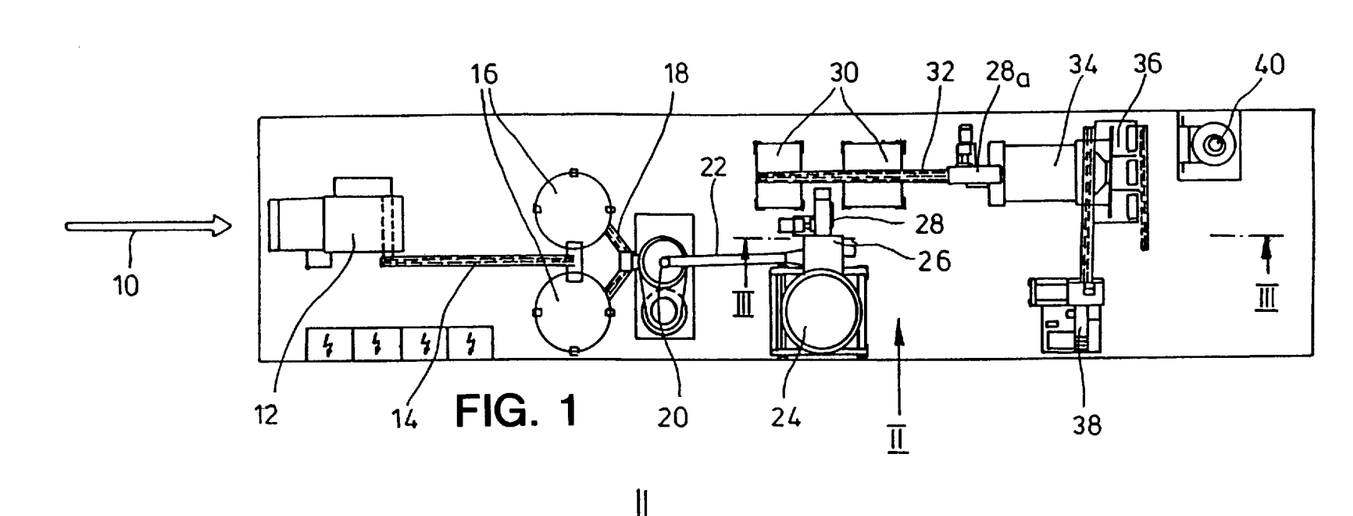
FIG. 1 is a plan view of an installation for treating composite elements.
Figure 2:
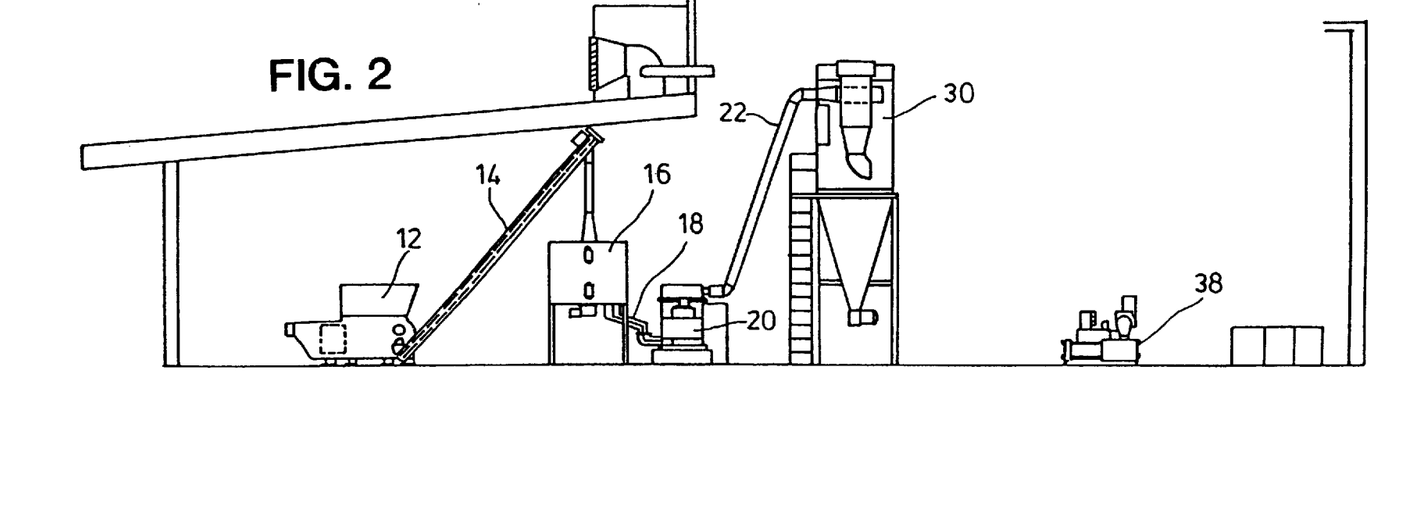
FIG. 2 is a partial side view of FIG. 1 viewing along the arrow II therein.

Referring to FIG. 1, composite elements 10 of solid organic and/or inorganic composite materials such as composites of metal/metal, plastic/plastic, metal/plastic or mineral composites with metals and/or plastic materials, are crushed or reduced in size to a grain size of 5 to 30 mm by producing solid particles in a pre-crusher 12, and fed by way of a screw 14 for metering purposes to silo containers 16. From the silo containers 16 metering screws 18 convey the solid particles produced to a separation or breaking-up unit 20 in which they are selectively broken up.

In the separation or breaking-up unit 20 the composite elements 10 are broken down into their components and the detached layers are fed in the form of a mixture by way of pipes or conduits 22 to a cyclone filter 24 in order to be conveyed by way of a cell-wheel charging device 26 on to an elevator 28 for conveying the mixture of the components into further silos 30 for the purposes of intermediate storage. Connected downstream thereof is a conveyor screw 32 by way of which and a further elevator 28$_a$ the mixture passes into a sifting or sieving device 34 in which the mixture is subjected to separation.

The mixture which is not made up of pure kinds of materials is then fed to fluid bed separators 36 for the separation operation. The components which are each of an individual kind of material go from the sieving device 34 or the fluid bed separator 36 to an extruder 38 or to a bagging station 40; the components of the composite elements 10, which components are now present as individual kinds of material, are passed to a procedure where they can be put to good use.

Figures 3, 8, 9:
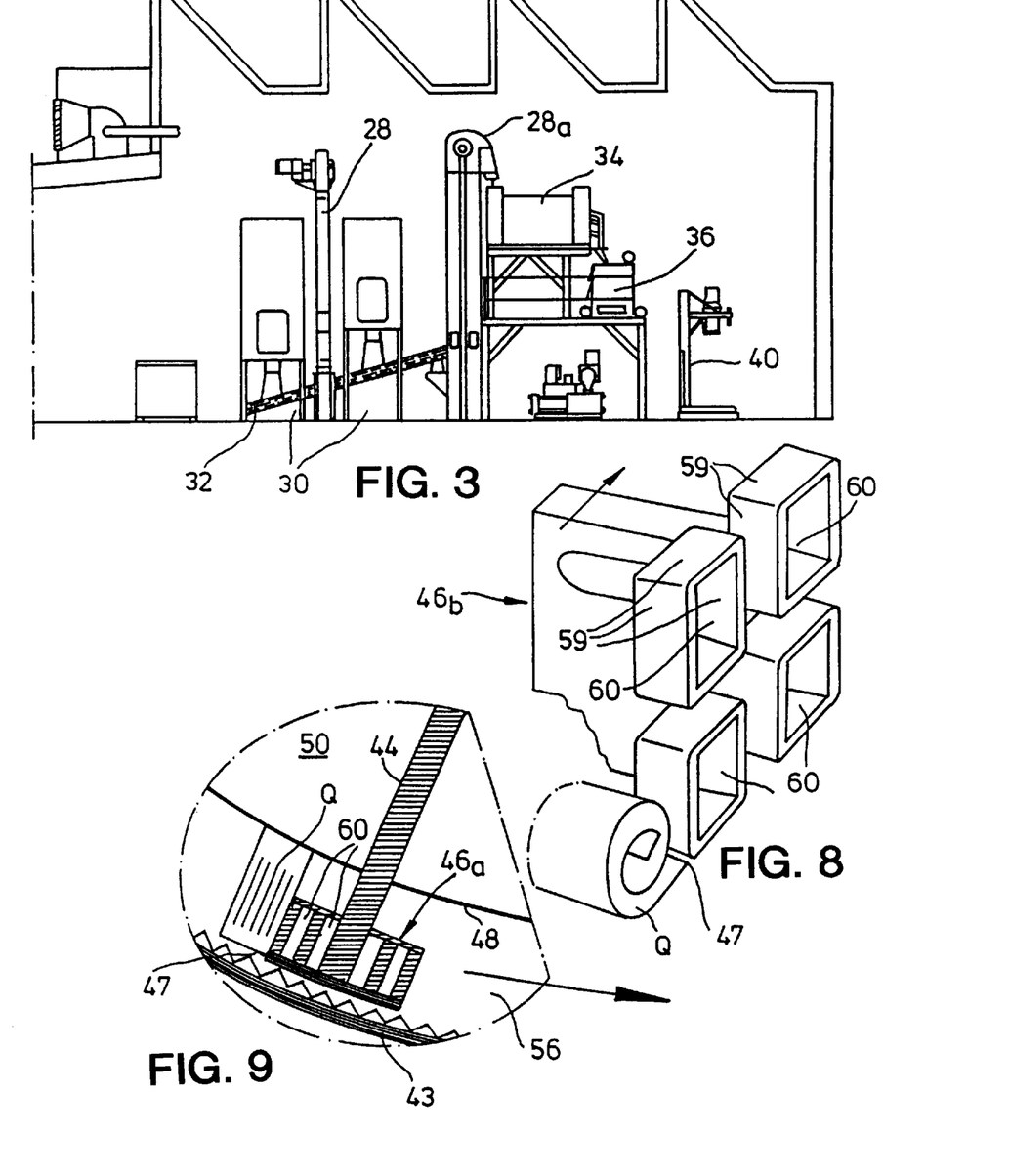
FIG. 3 is a view in section through FIG. 1 taken along line III—III therein.
FIGS. 6 to 8 show perspective views of different embodiments of tools of the separation or breaking-up unit, on an enlarged scale.
FIG. 9 is a view in section through a part of a further separation or breaking-up unit.
Figure 4:
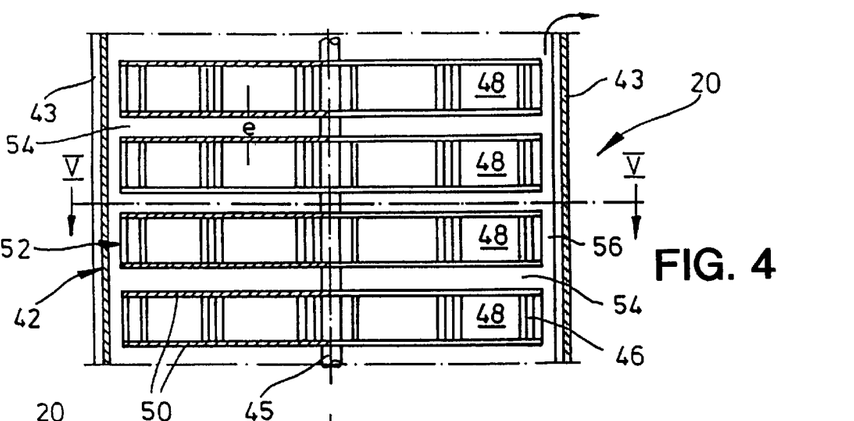
FIG. 4 is a partly sectional elevation of a separation or breaking-up unit from the installation unit shown in FIG. 1.
Figures 5A, 5B, 6, 7:
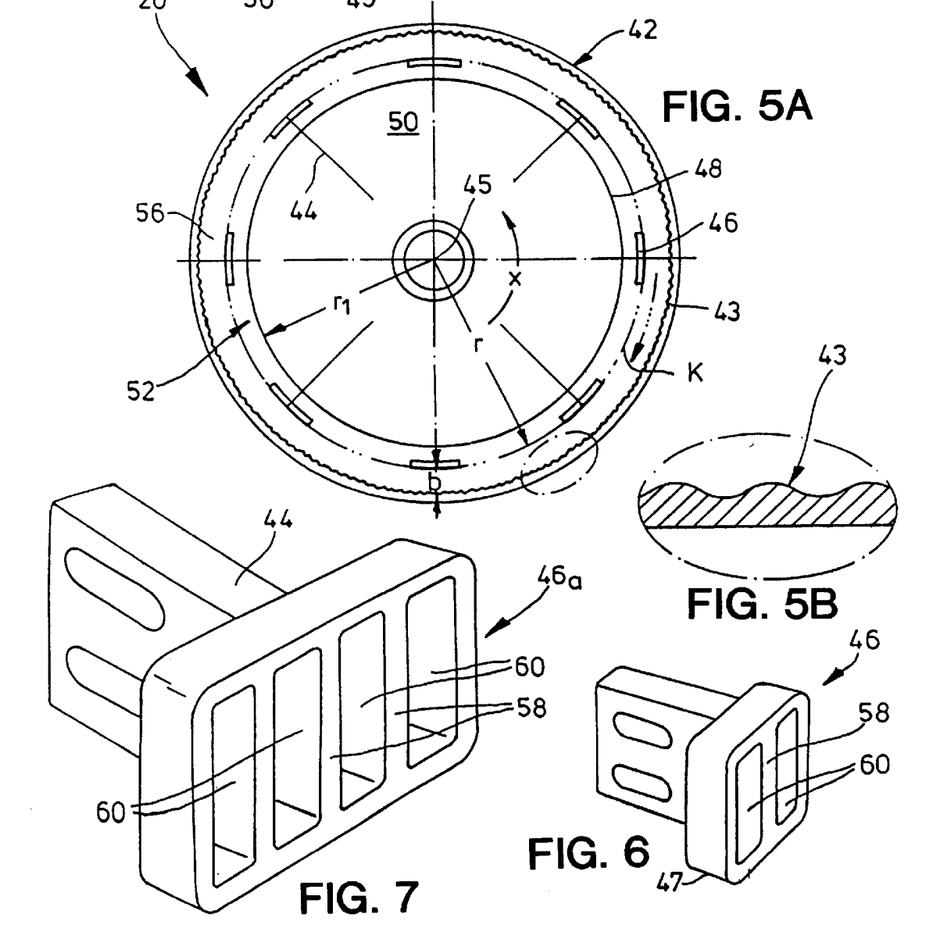

In FIG. 4 the separation or breaking-up unit 20 includes, within a cylindrical housing 42, tools 46 on radial arms 44 of a vertical driven shaft 45. The wall 43 of the housing 42 has an inside surface which is profiled in respect of its cross-section, for example in FIG. 5 it is of a corrugated or wavy shape while in FIG. 9 it is of a sawtooth-like cross-section.

The housing 42 which serves as a stator defines one side of the flow path for the mixture of solid particles and carrier fluid, for example air; the other side, in the four stages indicated in FIG. 4, is defined by the tools 46 or by a tubular wall 48 which is disposed within the construction circle K for the tool positions of the radius r and which extends between two plates 50 of each stage, which plates are disposed at spacings a from each other. The radius thereof is identified by $r_1$ and measures from five to ten times the width b of a narrow annular space 56 which extends within the housing 42.

The shaft 45, together with the stages projecting therefrom and consisting of the radial arms 44, the tools 46, the tubular wall 58 and the plates 50, forms a rotor 52, between the stages of which the two plates 50 which are adjacent at the spacing e define a gap 54.

The mixture of solid particles and transport air is fed to the annular space 56 of the lowermost stage, which is between the stator 42 and the rotor 52, so that the mixture flows in the opposite direction to the direction of rotation x of the rotor 52. In that situation, a downstream eddy as is indicated at Q in FIG. 9 is produced downstream of each tool 46—as viewed in the direction of rotation x—, the tool providing a flow-breakaway edge 47. In that eddy Q the flow of mixture is abruptly accelerated, the solid particles are rubbed against each other and in so doing are separated into their components. The peripheral speed of the flow-breakaway edge 47, the process temperature and the quantitative air through-put can be preselected for that purpose, as well as the shape of the eddy formation by virtue of the stator profile/tool shape pairing.

Before passing into the next stage the flow of mixture can briefly expand in the gap 54 in order then to pass into the following annular space 56.

Referring to FIGS. 6 to 9, shown therein are tool shapes, although the simplest tool shape, a radial plate which projects into the annular space 56, is not shown. The through openings which are defined in the tools 46, 46$_a$, 46$_b$ by vertical ribs 58 or wall portions 59 form chambers 60 which alter the described eddy formation; the design configuration of the tools alters the levels of intensity of the turbulence effects produced and thus the effects on the composite elements (acceleration, impact or impingement energy or the like). The vertical ribs 58 produce chambers 60 which are extended vertically in side-by-side relationship and the wall portions 59 produce a plurality of chambers 60 which are also disposed one above the other.

Figures 10, 11, 12, 13, 14:
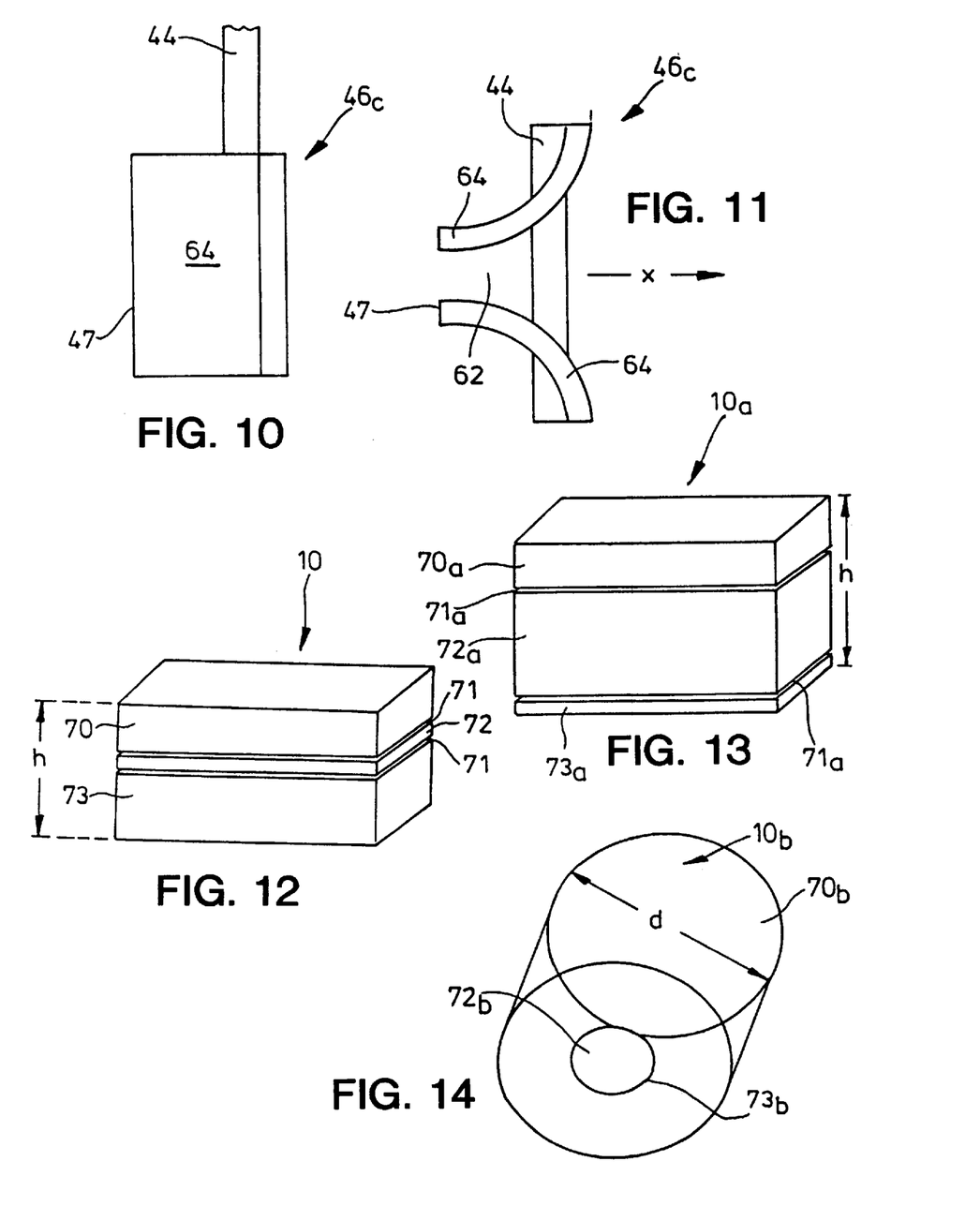

The tool 46 shown in FIGS. 10 and 11 provides two radial profiles 64 which in cross-section are curved towards each other and which define a nozzle gap 62; here the flow of mixture is already additionally accelerated in a second axis, upstream of the flow-breakaway edge 47.

Some examples of composite elements are intended to help to describe the process in greater detail.

EXAMPLE 1

Layer structure of a tube laminate as a composite element 10 in FIG. 12:

| | |
|---|---|
| Component 70 | LPDE 120 $\mu$m |
| Bonding agent 71 | |
| Component 72 | Aluminium 25–40 $\mu$m |
| Bonding agent 71 | |
| Component 73 | LPDE 180. |

The total layer thickness h measures here about 325–340 $\mu$m.

EXAMPLE 2

Layer structure of an instrument panel of a private motor vehicle as a composite element 10$_a$ in FIG. 13:

| | |
|---|---|
| Component 70a | ABS 1.2 mm |
| 2-component adhesive 71a | |
| Component 72a | PUR-foam 3.5 mm |
| 2-component adhesive 71a | |
| Component 73a | PVC-foil 250 $\mu$m |

The total layer thickness h measures here about 4.95 mm.

EXAMPLE 3

Layer structure of copper-plated aluminium wires as a composite element 10$b$ in FIG. 14:

| | |
|---|---|
| Component 70b: | PVC 500 $\mu$m (insulation) |
| Component 72b: | Aluminium Ø 0.5 mm |
| Component 73b: | Electrochemical copper application 9 $\mu$m |

The total layer thickness (diameter d) measures here about 1009 $\mu$m.

The following operating parameters apply in regard to the above Examples:

TABLE 1

OPERATING PARAMETERS

| Product | Tube laminate Example 1 | Instrument panels Example 2 Index 'a' | Aluminium wire Example 3 Index 'b' |
|---|---|---|---|
| Number of layers | 3 | 3 | 3 |
| Component 70 | LDPE | ABS | PVC |
| Component 72 | Aluminium | PUR-foam | Aluminium |
| Component 73 | LDPE | PVC-foil | Copper |
| Layer thicknesses 70 | 120 $\mu$m | 1.2 mm | 300 $\mu$m |
| Layer thicknesses 72 | 25–40 $\mu$m | 3.5 mm | Ø 0.5 mm |
| Layer thicknesses 73 | 180 $\mu$m | 250 $\mu$m | 9 mm |
| Total | 325–340 $\mu$m | 4.95 mm | 1009 $\mu$m |
| Entry acceleration | 38 m/sec$^2$ | 23 m/sec$^2$ | 53 m/sec$^2$ |
| Temperature | 75° C. | 30° C. | 40° C. |
| Peripheral speed | 180 m/sec | 72 m/sec | 85 m/sec |
| Quantitative air through-put | 5250 N m$^3$/h | 8100 Nm$^3$/h | 6320 Nm$^3$/h |

The layer thicknesses of the components are therefore between 9 $\mu$m and 3.5 mm or 3500 $\mu$m. Acceleration of the material in the separation or breaking-up unit 20 is between 23 and 53 m/sec$^2$, which corresponds to a process time of 0.015 to 0.078 sec.

With a peripheral speed of the rotor 52 relative to the stator 42 of 72–180 m/sec, the quantitative through-put is between 5250–8100 Nm³/h, with an amount of solid of about 500 kg/h. With higher through-put rates, the amounts of air are to be increased linearly.

The composite element 10, $10_a$, $10_b$ is selectively broken up by liberating the different physical properties of the composite materials —in particular density, tensile tearing strength, resiliency, thermal expansion and thermal transfer as well as elasticity and the molecular structural differences related thereto—and the adhesions of the composite materials to each other are destroyed.

By virtue of the treatment in the separation or breaking-up unit 20, the composite element 10, $10_a$, $10_b$ is broken up into very different structures, in which respect the individual components also behave differently in relation to dimensions and geometry, as a result of their different physical characteristics.

The composite elements 10, $10_a$, $10_b$ can be compacted, for example extruded, prior to the breaking-up procedure. It has been found that, with this selective breaking-up procedure, the constituents of polyethylene remain substantially unaltered while metal constituents, for example of aluminiun—which previously were present in flat form—are deformed to constitute onion-like structures. Plastic composites, for example polystyrene-polyethylene, are broken up without marked deformation into different structures, with discernible differences in relation to the particle sizes; they are considerably larger than the above-mentioned aluminium onion-like structures.

The selective breaking-up procedure causes the individual layers of the composite element 10, $10_a$, $10_b$ to be detached, without the layer thickness of the components being reduced.

A comparison between the particle sizes of the composite materials before the breaking-up unit 20 (pre-crushed), the selective breaking-up procedure and discharge after the selective breaking-up procedure, is shown in the following Table:

TABLE 2

| Product | Tube laminate Example 1 | Instrument panels Example 2 Index 'a' | Aluminium wire Example 3 Index 'b' |
| --- | --- | --- | --- |
| Input:* | | | |
| Layer thickness | ~325–340 μm | ~4.95 mm | Ø 1009 μm |
| Pre-crushed | 8 mm | 10 mm | 16 mm |
| Structure | Flakes | Granulate | Cylinder shape |
| Discharge:* | | | |
| Layer thicknesses | | | |
| Component 70 | 120 μm | 1.2 mm | 500 μm |
| Component 72 | Ø 100–180 μm | 3.5 mm | Ø 1.8 mm |
| Component 73 | 180 μm | 250 μm | Ø 47 μm |
| Particle sizes: | | | |
| Component 70 | 6.2 mm | 8.3 mm | 14 mm |
| Component 72 | Ø 150–180 μm | 3.9 mm | Ø 1.8 |
| Component 73 | 6.5 mm | 9.6 mm | Ø 47 μm |
| Structure: | | | |
| Component 70 | Flakes | Chips | Tube Ø (split open) |
| Component 72 | Onion | Granulate (cubic) | Onion |
| Component 73 | Flakes | Flakes | Onion |

*Mean values

In this procedure for selectively breaking up the composite elements 10, $10_a$, $10_b$ separation of the components takes place in dependence on the physical differences in the components relative to each other as between the respective layers. A crushing operation does not involve breaking up a composite element in dependence on the physical differences.

Figure 15:
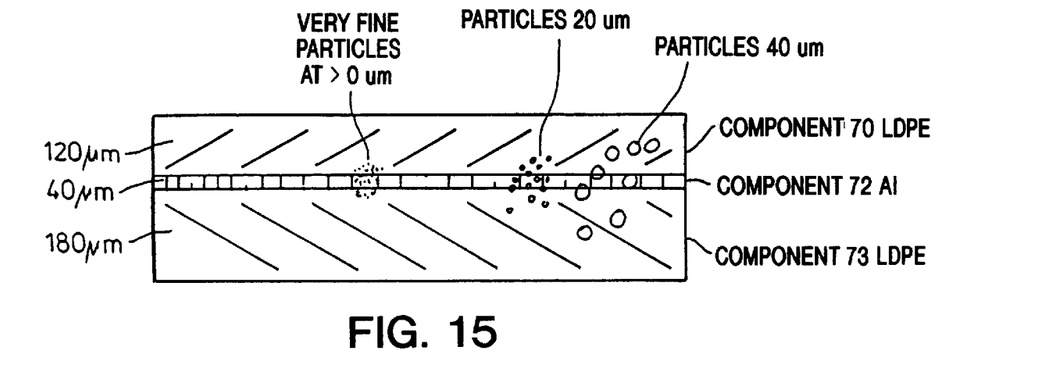
FIG. 15 is a view in cross-section through a composite element with references to the crushing effect.

As already mentioned, the composite elements are conventionally broken up to a grain or particle size which must be smaller than the respective layer thickness of the components of the composite element; that is intended to be made clear by reference to FIG. 15.

Figure 16:
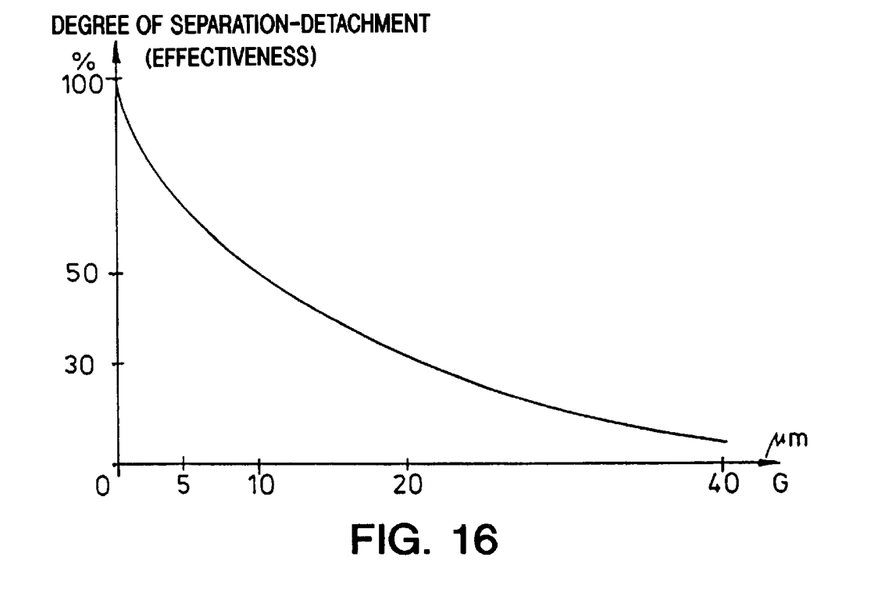
FIG. 16 shows a graph relating to the dependency of the degree of detachment on particle size.

That situation involves a grain size distribution which is not given by the components as such but by the required particle size, for example 100%<300 μm. The degree of separation or detachment is plotted in FIG. 16, in relation to the broken-up particle size G.

Figure 17:
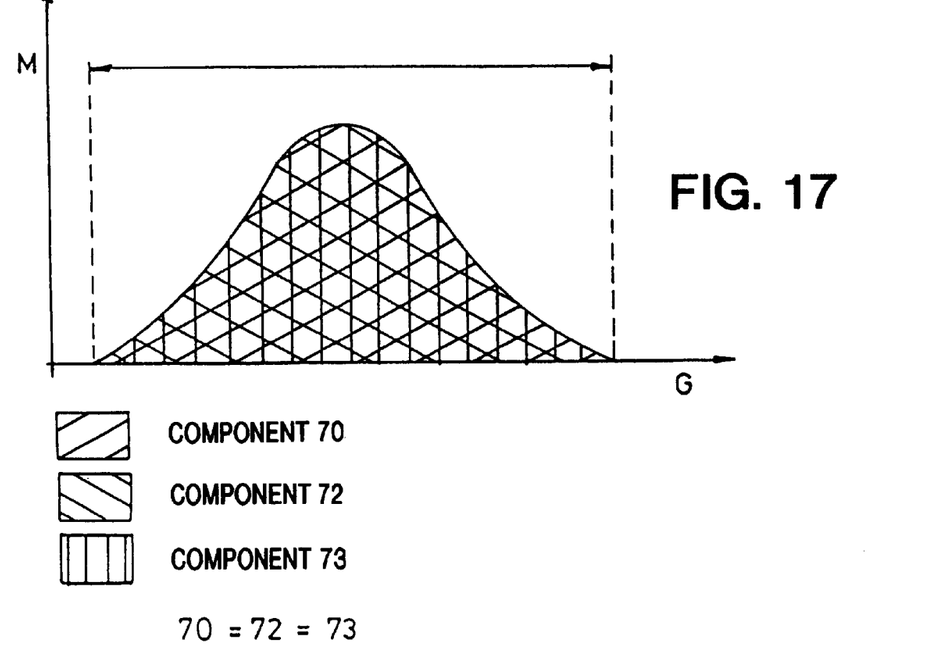
FIG. 17 shows a graph relating to grain size distribution when crushing a composite element of three components.

In this grain size distribution, as shown in FIG. 17, the components are homgeneously distributed in a band width (amount M relative to particle size G).

Separation can therefore be effected only to a limited degree in a sieving installation.

If the layer thicknesses require very fine grinding—as for example in the case of a tube laminate of aluminium, measuring 25–40 μm—that involves a necessary particle size of <25–40 μm in order to be able to effect separation.

That necessary particle size is unavoidably also achieved in regard to the other components such as LDPE. Separation of the components is thereby practically precluded as the differences required for the separation procedure do not occur.

In the described process the components are now present in different particle sizes. Contrary to a crushing procedure (fine grinding) —as FIG. 17 makes clear by reference to a graph in respect of the amounts M in relation to the grain or particle size G—the distribution in respect of size of the particles is not in superimposed relationship but in juxtaposed relation (FIG. 18).

The differences in the breaking-up or deformation characteristics of the components mean that the individual layers become detached from each other so that thereafter the plastic materials and the metal portions can be separated.

Thus for example the large particles are separated from the small particles in a sieve as the products which have been less substantially broken up remain in the sieve while the smaller particles pass through the meshes.

Figure 18:
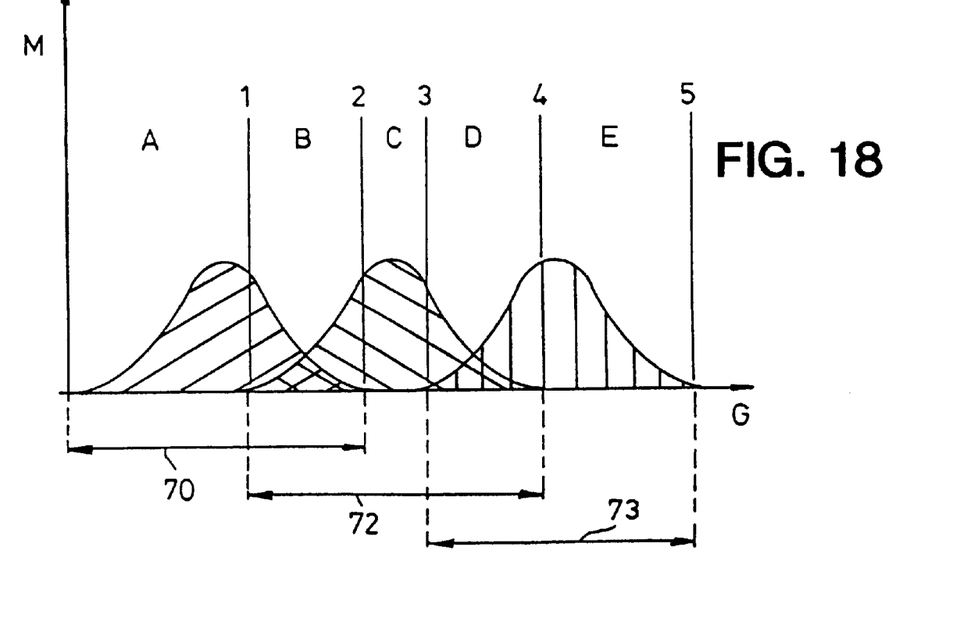
FIG. 18 shows the distribution of the grain sizes upon selective breaking-up in the separation or breaking-up unit.
Figure 19:
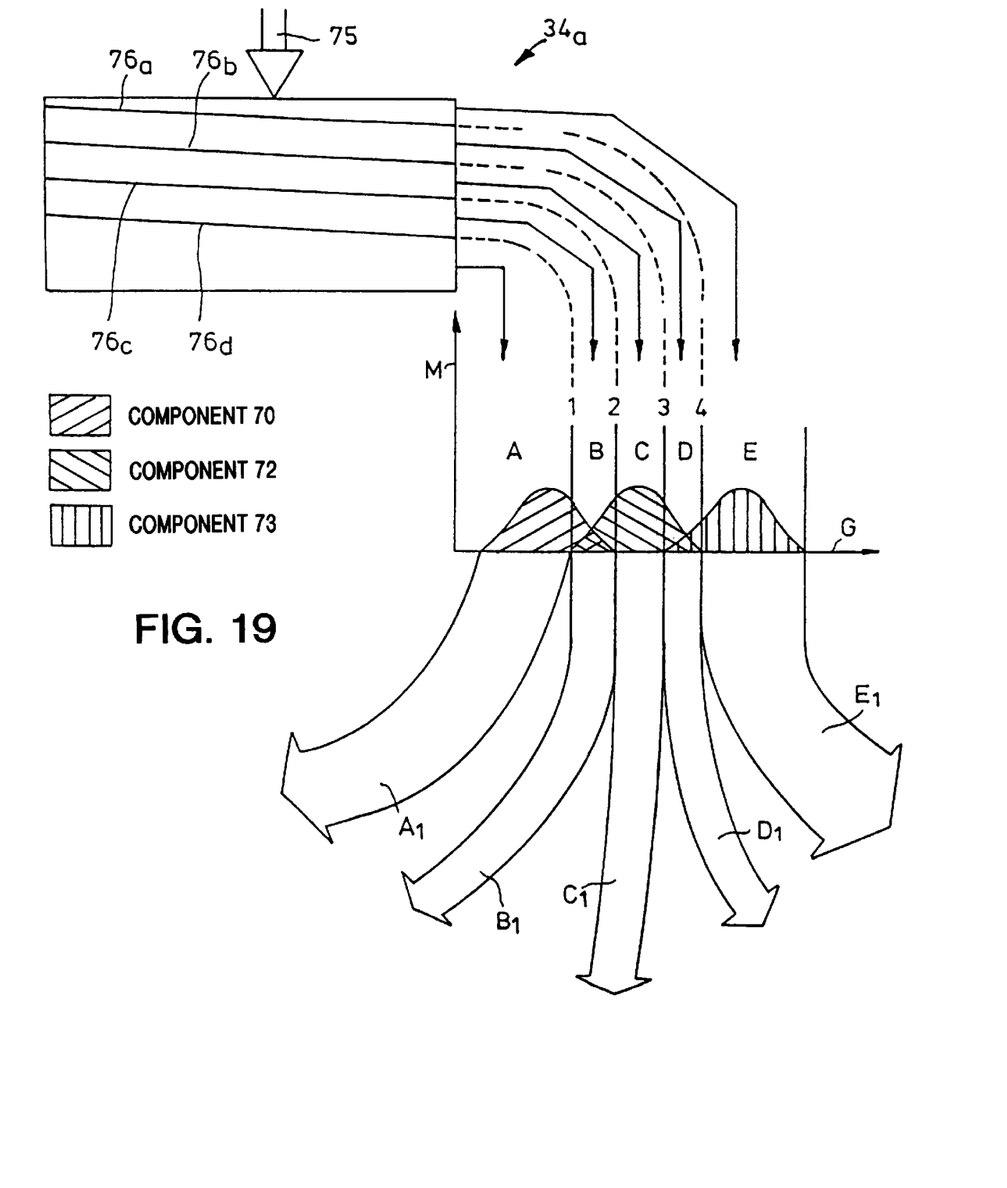
FIG. 19 is a graph relating to the separation of selectively broken-up composite materials.

That sieving operation is effected in a multi-plane sieving installation $34_a$ which is diagrammatically shown in FIG. 19 and whose feed is identified by reference numeral 75 and whose sieve layers $76_a$ to $76_d$ are so designed that they correspond to the sieve sections 1 to 4 in FIG. 18, which permits substantial separation of the components. Thus the regions A, C and E already occur in the form of a single kind of material (flows $A_1$; $C_1$; $E_1$), while the flows $B_1$, $D_1$ of the region B (overlap amount component ½) and the region D (overlap amount component ⅔) are then fed to a further separation operation on separating tables and/or on a fluid bed, in which respect the structures, densities and geometrical and gravimetric differences are used for separation purposes.

As soon as a metal and/or plastic fraction is obtained by the separation procedure, the fractions can be compacted. That compacting operation is effected by agglomeration and/or extrusion.

We claim:

1. A process for recovering individual components of a multi-component composite element having at least a first component and a second component comprising the steps of:

(a) providing a sizing unit;

(b) sizing the multi-component composite element into a plurality of particles;

(c) providing a multi-stage separation-deformation unit wherein each stage comprises at least one rotating blade proximate to a casing;

(d) passing a fluidized stream to the multi-stage separation-deformation unit wherein the at least one rotating blade intersects the fluidized stream and is moved relative to the fluidized stream to produce flow-breakaway edges for forming eddies;

(e) feeding the sized particles in the fluidized stream to the flow-breaking edges with an acceleration of between 20 to 60 m/sec$^2$ wherein the individual components of the sized multi-component element are separated from each other along phase boundaries due to acceleration and frictional forces;

(f) subsequently treating the first component and the second component in said multi-stage separation-deformation unit;

(g) removing the separated individual components from said multi-stage separation-deformation unit;

(h) separating the first component from the second component; and (i) further separating the first component and the second component by sizing.

2. A process according to claim 1 wherein during the separation the components are separated from each other with the application of heat.

3. A process according to claim 2 including heating during the separation to a temperature of between 10° C. and 75° C. and providing a peripheral speed at the flow-breakaway edge of between 50 and 200 m/sec.

4. A process according to claim 3, wherein the temperature is about 30° to 70° C. and the peripheral speed about 70 to 180 m/sec.

5. A process according to claim 2 wherein the air through-put is from 5000 to 5600 Nm$^3$/h.

6. A process according to claim 5, wherein the air through-put is about 5250 Nm$^3$/h.

7. A process according to claim 1 including a fluidized stream having an air through-put of from 7800 to 8500 Nm$^3$/h.

8. A process according to claim 7, wherein the air through-put is about 8100 Nm$^3$/h.

9. A process according to claim 1 wherein during the separation the components are separated from each other with the addition of liquid.

10. A process according to claim 1 including feeding the sized particles under the following condition: an acceleration of between 20 and 60 m/sec$^2$, a peripheral speed of between 70 and 200 m/sec, and a quantitative air through-put of between 5000 and 8500 Nm$^3$/h.

11. A process according to claim 10, wherein the acceleration of the solid particles is between 23 and 53 m/sec$^2$ and the peripheral speed between 72 to 180 m/sec.

12. A process according to claim 1 including feeding the sized particle under the following condition: an acceleration of 35 to 40 m/sec$^2$, a temperature of from 70 to 80° C., and a peripheral speed of 150 to 200 m/sec during the separation or breaking-up procedure for a composite element of high surface adhesion.

13. A process according to claim 12 with an acceleration of about 38 m/sec$^2$, a temperature of about 75° C. and a peripheral speed of about 180 m/sec during the separation or breaking-up procedure.

14. A process according to claim 12 wherein the composite element comprises a tube laminate of aluminum foil coated with LDPE.

15. A process according to claim 1 including feeding the sized particle under the following condition: an acceleration of 20 to 30 m/sec$^2$, a temperature of from 25 to 35° C., and a peripheral speed of from 68 to 77 m/sec during the separation or breaking-up procedure for internal cladding shells in the motor vehicle industry.

16. A process according to claim 15, wherein the acceleration is about 23 M/sec$^2$, the temperature is about 30° C., and the peripheral speed is about 72 m/sec wherein the composite element comprises instrument panels with ABS, PUR-foam and PVC-foil constituents.

17. A process according to claim 1 including feeding the sized particle under the following condition: an acceleration of from 48 to 56 m/sec$^2$, a temperature of from 35 to 45° C., and a peripheral speed of from 80 to 90 m/sec during the separation or breaking-up procedure for wire-form layer material.

18. A process according to claim 17 including a fluidized stream having an air through-put of from 6000 to 7000 Nm$^3$/h.

19. A process according to claim 18 including a fluid stream being an air through-put about 6320 Nm$^3$/h.

20. A process according to claim 17, wherein the acceleration is about 53 m/sec$^2$, the temperature is about 40° C. and the peripheral speed is about 85 m/sec and wherein the composite element comprises an aluminium wire with a copper layer and a PVC-sheath.

21. A process according to claim 1 wherein the composite element is compacted prior to the separation.

22. A process according to claim 1 wherein the separation step is carried out on separating tables.

23. A process according to claim 1 wherein said first component is selected from the group consisting of metals, plastics, mineral compositions, and mixtures thereof and said second component is selected from the group consisting of metals, plastics, mineral compositions, and mixtures thereof.

24. A process according to claim 23 wherein the first component and the second component are extruded after the separation operation.

25. A process according in claim 1, wherein the components of the solid portions are detached from each other or separated from each other with division of the layers of said composite material.

26. A process according to claim 1 wherein during the separation the components are separated from each other with the addition of gas.

27. A process according to claim 1 wherein the separation step is carried out by means of fluid bed separators.

28. A process according to claim 1 including a fluidized stream having an air through-put of from 6000 to 7000 Nm$^3$/h.

29. A process for recovering individual components of a multi-component composite element having at least a metal component and a plastic component comprising the steps of:

(a) providing a sizing unit;

(b) sizing the multi-component composite element into a plurality of particles having a size distribution of between about 5 mm to 30 mm;

(c) providing a multi-stage separation-deformation unit wherein each stage comprises at least one rotating blade proximate to a casing;

(d) passing a fluidized stream to the multi-stage separation-deformation unit wherein the at least one rotating blade intersects the fluidized stream and is moved relative to the fluidized stream to produce flow-breakaway edges for forming eddies;

(e) feeding the sized particles in the fluidized stream to the flow-breaking edges with an acceleration of between 20 to 60 m/sec$^2$ wherein the individual components of the sized multi-component element are separated from each other along phase boundaries due to acceleration and frictional forces;

(f) subsequently deforming the metal component in said multi-stage separation-deformation unit;

(g) removing the separated individual components from said multi-stage separation-deformation unit;

(h) separating the deformed metal component from the plastic component; and (i) further separating the deformed metal component by sizing.

* * * * *